United States Patent
Weber (10) Patent No.: US 10,302,492 B2
(45) Date of Patent: May 28, 2019

(54) OPTOELECTRONIC SENSOR DEVICE AND METHOD TO OPERATE AN OPTOELECTRONIC SENSOR DEVICE

(71) Applicant: OSRAM Opto Semiconductors GmbH, Regensburg (DE)

(72) Inventor: Rolf Weber, San Jose, CA (US)

(73) Assignee: OSRAM Opto Semiconductors GmbH, Regensburg (DE)

( * ) Notice: Subject to any disclaimer, the term of this patent is extended or adjusted under 35 U.S.C. 154(b) by 8 days.

(21) Appl. No.: 15/699,596

(22) Filed: Sep. 8, 2017

(65) Prior Publication Data

US 2019/0078934 A1    Mar. 14, 2019

(51) Int. Cl.
| | |
|---|---|
| *G01J 3/00* | (2006.01) |
| *G01J 3/26* | (2006.01) |
| *G01J 3/02* | (2006.01) |
| *G06K 9/00* | (2006.01) |
| *G01B 11/24* | (2006.01) |
| *G01V 8/14* | (2006.01) |
| *G01S 17/10* | (2006.01) |

(52) U.S. Cl.
CPC ............ *G01J 3/26* (2013.01); *G01J 3/027* (2013.01); *G01B 11/24* (2013.01); *G01S 17/10* (2013.01); *G01V 8/14* (2013.01); *G06K 9/00604* (2013.01)

(58) Field of Classification Search
CPC .. G01J 3/0272; G01J 3/26; G01J 3/027; G01J 3/00; G01J 3/0202; G01J 3/28; G01V 8/02; G06K 9/00604; G06K 9/00; G06K 9/00335; G01S 17/026
See application file for complete search history.

(56) References Cited

U.S. PATENT DOCUMENTS

2005/0199890 A1 *   9/2005   Morgott ...................... 257/80
2011/0279824 A1    11/2011   Blomberg et al.

OTHER PUBLICATIONS

Companies commercialise VTT technology that miniaturises measuring devices, VTT Technical Research Centre of Finland LTD, May 13, 2014, 1 page.

* cited by examiner

*Primary Examiner* — David P Porta
(74) *Attorney, Agent, or Firm* — Slater Matsil, LLP (57) ABSTRACT

An optoelectronic sensor device and a method for operating an optoelectronic sensor device are disclosed. In an embodiment the optoelectronic sensor device includes a radiation-emitting semiconductor chip configured to emit radiation with a peak wavelength which depends on a temperature of the radiation-emitting semiconductor chip. The sensor device further includes a sensor chip configured to detect a part of the radiation reflected back to the sensor chip as well as a spectral filter component having an adjustable spectral transmission range. A wavelength determination unit is configured to determine the peak wavelength and a filter driver is configured to adjust the spectral transmission range to the determined peak wavelength.

14 Claims, 5 Drawing Sheets

OPTOELECTRONIC SENSOR DEVICE AND METHOD TO OPERATE AN OPTOELECTRONIC SENSOR DEVICE

TECHNICAL FIELD

The invention is related to an optoelectronic sensor device and a method for operating such an optoelectronic sensor device.

SUMMARY

Embodiments provide an optoelectronic sensor device with an increased sensitivity.

According to at least one embodiment, the sensor device comprises one or a plurality of radiation-emitting semiconductor chips. The at least one semiconductor chip is designed to emit radiation with a peak wavelength. The peak wavelength depends on a temperature of the radiation-emitting semiconductor chip. If there is a plurality of radiation-emitting semiconductor chips, then the semiconductor chips can be of identical construction or can be of different construction so as to emit radiation with different peak wavelengths. Preferably, the radiation-emitting semiconductor chips are selected from laser diodes and/or light-emitting diodes, LD and LED for short.

According to at least one embodiment, the optoelectronic sensor device comprises one or a plurality of sensor chips. The at least one sensor chip is designed to detect at least a part of the radiation generated by the at least one radiation-emitting semiconductor chip reflected back to the sensor chip. For example, the radiation emitted by the semiconductor chip is reflected at an object to be measured or detected by the sensor device and the radiation subsequently reaches the sensor chip, is absorbed in the sensor chip and converted into electrical signals.

According to at least one embodiment, the sensor device comprises one or a plurality of spectral filter components. The at least one spectral filter component comprises an adjustable spectral transmission range. That is, the spectral filter component is transmissive only in the spectral transmission range. This applies in particular for the relevant spectral range which can span from visible radiation into near infrared radiation. For example, the relevant spectral range is from 400 nm to 1.3 µm inclusive.

According to at least one embodiment, the sensor device includes a wavelength determination unit. The wavelength determination unit is designed to determine the peak wavelength. The peak wavelength can be directly measured, for example, by a photosensor in combination with a filter or can be derived from non-spectral data like temperature.

According to at least one embodiment, the sensor device comprises a filter driver. The filter driver is designed to adjust the spectral transmission range to the determined peak wavelength. That is, the spectral transmission range of the spectral filter component can be adapted to the peak wavelength which is generated depending on the temperature of the radiation-emitting semiconductor chip. That is, the temperature-induced shifts of the peak wavelength can be compensated with a view to the spectral filter component by means of the filter driver.

In at least one embodiment the optoelectronic sensor device comprises a radiation-emitting semiconductor chip to emit radiation with a peak wavelength which depends on a temperature of the radiation-emitting semiconductor chip. The sensor device further comprises at least one sensor chip to detect a part of the radiation reflected back to the sensor chip as well as a spectral filter component having an adjustable spectral transmission range. A wavelength determination unit of the sensor device is designed to determine the peak wavelength and a filter driver is to adjust the spectral transmission range to the determined peak wavelength.

In the optoelectronic sensor device described herein, preferably infrared-emitting semiconductor lasers and/or infrared-emitting LEDs can be used preferably for time-of-flight, proximity or other methods of three-dimensional detection or presence detection. In these applications, bandpass filters are common to suppress the influence of ambient light, like sunlight, and to increase the signal-to-noise ratio. However, due to thermal wavelength drift of the light source a spectral transmission range of a bandpass filter has to be relatively wide in a common setup so that high intensities, in particular of infrared light, are required to outshine the ambient light.

That is, in common devices very narrow bandpass filters with the spectral width of a passband in the range of 5 nm to 10 nm cannot be used due to the thermal wavelength drift of the light source used. The wider passband of the filter needs to be compensated by more intense infrared light to outshine the ambient light in the common setup.

In the sensor device described herein, the adjustability of the spectral transmission range of the spectral filter component allows for the use of a bandpass filter having a narrow spectral transmission range. In particular, an interference filter is used in the front of the sensor device which is preferably a three-dimensional detection system like Lidar, structured light, time-of-flight or proximity sensor. A photodiode or an image sensor can be used as the sensor chip. The interference filter has an adjustable passband.

For example, the interference filter is a MEMS filter like a Fabry-Perot filter. An adjustment of the passband of the interference filter is done, for example, by a change in a control voltage or by heat. The passband of the filter is narrow and has, for example, a spectral transmission range of 5 nm, 10 nm or 15 nm or the like. A wavelength shift of the peak wavelength due to temperature changes is determined, for example, by measuring the temperature of the radiation-emitting semiconductor chip and/or by some test pulses where the passband is shifted until the signal of the sensor chip is maximized.

With such a system, bandpass filters can be used which allow more ambient light suppression and/or allow a reduction of the system produced light level.

Moreover, with the filter having the adjustable transmission range it is possible to compensate partly or completely for differences in the peak wavelength of the light source due to the production thereof. Thus, less care is necessary to select and/or to bin the light sources after production, e. g. after epitaxial growth.

According to at least one embodiment, the filter component is an interference filter. In particular, the filter component is designed as a Fabry-Perot filter.

According to at least one embodiment, the spectral transmission range is at least 2 nm or 5 nm or 8 nm. As an alternative or in addition, the spectral transmission range is at most 20 nm or 15 nm or 10 nm or 8 nm. That is, the spectral transmission range is comparably small. Preferably the spectral width of the spectral transmission range does not vary or does not significantly vary by a change of temperature of the sensor device within the intended temperature range.

According to at least one embodiment, a change of the peak wavelength depending on the temperature of the radiation-emitting semiconductor chip is at least 0.1 nm/° C. or 0.2 nm/° C. Alternatively or in addition, the change of the peak wavelength is at most 0.9 nm/° C. or at most 0.6 nm/° C. or at most 0.4 nm/° C. That is, the change of the peak wavelength is comparably large concerning temperature variations.

According to at least one embodiment, a spectral width of the emitted radiation is at least 1 nm or 2 nm or 5 nm. As an alternative or in addition, the spectral width is at most 20 nm or 15 nm or 10 nm or 5 nm. That is, the spectral width of the emitted radiation is in the same order as the spectral transmission range.

According to at least one embodiment, an intended operation temperature of the sensor device spans at least 50° C. or 70° C. For example, the intended temperature range for operating the sensor device begins at −30° C. or −20° C. and/or ends at 80° C. or 70° C. Such a large temperature range has to be ensured, for example, in applications in mobile phones like smartphones or in applications in the automotive branch, for example, in three-dimensional sensors for the measurement of distances.

According to at least one embodiment, the filter component comprises two mirrors which are arranged in a variable distance from one another. That is, the filter component can be a Fabry-Perot device.

According to at least one embodiment, a size of the filter component in top view amounts to at most 5 mm×5 mm or 3 mm×3 mm. As an alternative or in addition, the size of the filter component is at least 0.5 mm×0.5 mm or 1 mm×1 mm or 2 mm×2 mm. A thickness of the filter component is at most 2 mm or 1 mm or 0.5 mm, for example. That is, the filter component can be of a small size.

According to at least one embodiment, the radiation-emitting semiconductor chip is a pulsed semiconductor laser. The semiconductor laser can be of edge-emitting type or of surface-emitting type. A pulse width of the laser pulses amounts, for example, to at least 1 ns or 2 ns and/or to at most 20 ns or 10 ns or 6 ns. That is, the laser pulses can be of a comparably short duration.

According to at least one embodiment, the radiation-emitting semiconductor chip emits near infrared radiation. In particular, the peak wavelength is then at least 80 nm or 810 nm or 860 nm and/or at most 1.2 μm or 1.05 μm or 980 nm or 915 nm inclusive. In this case, the radiation-emitting semiconductor chip is preferably based on the material system AlInGaN.

According to at least one embodiment, the filter driver comprises a voltage source. The voltage source is to control a voltage applied to the filter component so that the spectral transmission range can be controlled by adjusting the voltage at the filter component. For example, the voltage applied is proportional to a distance of the mirrors of the filter component.

According to at least one embodiment, the filter driver comprises a temperature control unit. By means of the temperature control unit, a temperature of the filter component and/or of the radiation-emitting semiconductor chip can be controlled so that the spectral transmission range can be controlled by adjusting the temperature of the filter component. For example, an effective optical thickness of the filter component is changed by the influence of temperature.

According to at least one embodiment, the filter component comprises an electrochromic material. For example, an absorption edge or transmission edge of the electrochromic material is changed by the application of a voltage to said material. In order to have a bandpass filter, it is possible to combine two different electrochromic materials in the filter component so that both a blue-side cut-off wavelength and a red-side cut-off wavelength can be adjusted, for example, independently of one another or synchronously.

According to at least one embodiment, the filter driver comprises a temperature sensor. The temperature sensor is to measure the temperature of the radiation-emitting semiconductor chip. Thus, it is possible to calculate the peak wavelength in the filter driver from the measured temperature of the radiation-emitting semiconductor chip. Hence, the peak wavelength can indirectly be determined. Otherwise it is also possible to directly determine the peak wavelength from spectral data, for example, by means of a spectral sensor comprised by or attached to the filter driver.

According to at least one embodiment, the semiconductor device comprises two or more than two sensor chips. In particular, the at least two sensor chips are arranged to enable stereoscopic viewing of the sensor device.

According to at least one embodiment, the sensor device further comprises an optical element. For example, the optical element is a lens or a lens system or a mirror or a mirror system or a combination of at least one lens and at least one mirror. The optical element can have a fixed position or can also be movable, for example, a movable mirror. The optical element can comprise a lens array or a mirror array. It is also possible for the optical element to comprise a spectral dispersive component like a prism or a grating.

According to at least one embodiment, the optical element is to form a two-dimensional irradiation pattern of the radiation on an object. For example, a line pattern or a dot pattern is produced by the optical element. The line pattern and/or the dot pattern is preferably of a regular fashion.

According to at least one embodiment, the reflected irradiation pattern is detected by the sensor chips to allow for a three-dimensional measuring of the object illuminated with the irradiation pattern. This is also referred to as structured light. In particular, comparable monochrome and/or flat objects can be measured by means of an irradiation pattern as described.

According to at least one embodiment, the sensor chip allows for a time-of-flight measurement of the radiation from the radiation-emitting semiconductor chip and reflected from an object. Preferably, by means of the sensor chip a comparably high temporal resolution can be achieved. For example, the temporal resolution of the sensor chip is 10 ns or better or 5 ns or better or 2 ns or better. In particular, the temporal resolution of the sensor device is correlated with a reaction time to light of the sensor chip.

According to at least one embodiment, the sensor device further comprises a mirror. The mirror is preferably a distant mirror so that the mirror is arranged at some distance to the radiation-emitting semiconductor chip and to the sensor chip. In particular, a distance of the mirror to the radiation-emitting semiconductor chip amounts to at least ten times or 100 times or 1000 times the distance between the radiation-emitting semiconductor chip and the sensor chip. The distant mirror is designed to reflect the radiation from the radiation-emitting semiconductor chip to the sensor chip. That is, the sensor device can be a light barrier.

According to at least one embodiment, the sensor chip comprises a plurality of pixels. Preferably, in this case, an optical element is also present. Hence, the radiation reflected back to the sensor chip can be imaged onto the pixels. That is, the sensor device can be used as a recognition system, in particular as a biometric recognition system like an iris recognition system.

According to at least one embodiment, the sensor device is fashioned as a proximity sensor. For this purpose, the sensor device can comprise an electronic unit as is also possible in all the other exemplary embodiments. By the electronic unit information can be derived from a time-dependent intensity of a reflected light at the sensor chip.

Moreover, a method to operate an optoelectronic sensor device is also provided. In particular, the method is to operate an optoelectronic sensor device as described in connection with one or a plurality of the above-mentioned embodiments. Thus, features for the method are also disclosed for the optoelectronic sensor device and vice versa.

In at least one embodiment of the method, in operation the radiation-emitting semiconductor chip emits radiation with a peak wavelength which depends on a temperature of the radiation-emitting semiconductor chip. The sensor chip detects a part of the radiation which is reflected back to the sensor chip by an object in the exterior of the sensor device. The wavelength determination unit determines the peak wavelength temporarily or continuously. The spectral transmission range is adjusted by the filter driver to the determined peak wavelength.

According to at least one embodiment, the filter driver varies the spectral transmission range and test pulses are emitted for said spectral transmission ranges by the radiation-emitting semiconductor chip. An intensity of the reflection of said test pulses is measured by the sensor chip. The peak wavelength is determined by the wavelength determination unit based on the measured intensities. Hence, the spectral transmission range can be tuned by the filter driver to maximize the measured intensity. In other words, the spectral transmission range is shifted to said spectral position in which most of the light generated by the radiation-emitting semiconductor chip is reflected back to the sensor chip. This reflection can also be a light piping within the sensor device or can be a reflection on an external object.

BRIEF DESCRIPTION OF THE DRAWINGS

An optoelectronic sensor device and a method described are explained in greater detail below by way of exemplary embodiments with reference to the drawings. Elements which are the same in the individual figures are indicated with the same reference numerals. The relationships between the elements are not shown to scale, however, but rather individual elements may be shown exaggeratedly large to assist in understanding.

In the figures.

DETAILED DESCRIPTION OF ILLUSTRATIVE EMBODIMENTS

Figure 1:
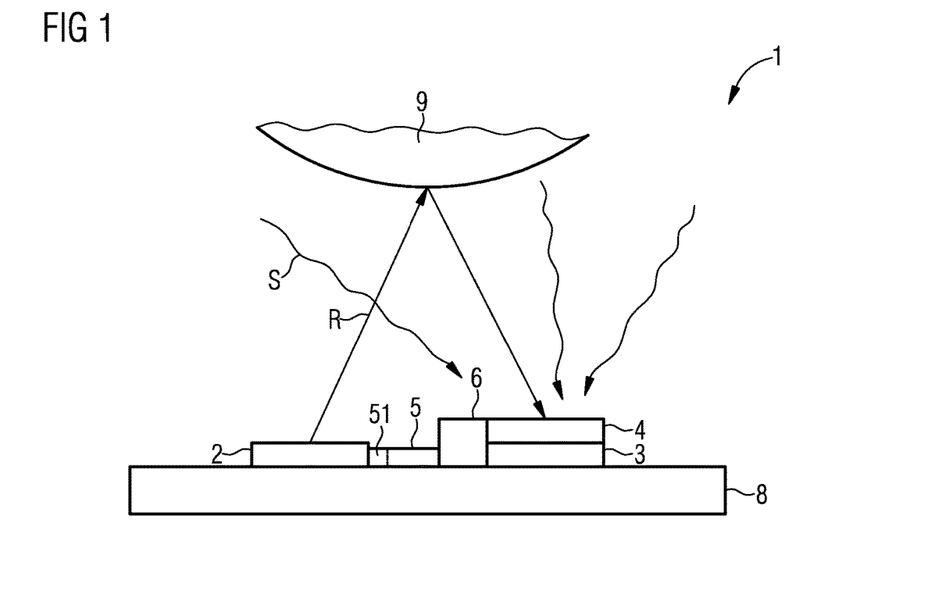
FIGS. 1 to 6 show schematic sectional representations of exemplary embodiments of optoelectronic sensor devices.

FIG. 1 shows an exemplary embodiment of an optoelectronic sensor device 1. The sensor device 1 comprises a radiation-emitting semiconductor chip 2. The semiconductor chip 2 is to emit radiation R. Preferably, the semiconductor chip 2 is a laser diode. The radiation R can be emitted in just one direction as indicated in FIG. 1. In a deviation from FIG. 1, the radiation R can also be emitted over a larger angular range.

Further, the sensor device 1 comprises a sensor chip 3. For example, the sensor chip 3 is a photodiode or a CCD, preferably based on silicon or on InAlGaAs. The sensor chip 3 is to detect a part of the radiation R reflected back from an object 9 in the exterior of the sensor device 1.

A spectral filter component 4 is arranged on the sensor chip 3. The filter component 4 has a comparably small spectral transmission range which is adjusted to a spectral range of the emitted radiation R by means of a filter driver 6. In particular, a wavelength of the radiation R is dependent on a temperature of the semiconductor chip 2. Hence, a wavelength determination unit 5 can comprise a temperature sensor 51 to measure a temperature of the semiconductor chip 2. By means of the measured temperature, the spectral range of the emitted radiation R is determined and the filter component 4 is adjusted accordingly.

Thus, the spectral transmission range of the filter component 4 is adapted to match a spectral width and a peak wavelength of the radiation R. Hence, the sensor chip 3 is sensitive practically only in the spectral range of the radiation R due to the filter component 4. Thus, ambient light S coming from all directions and maybe also from the object 9 can be greatly suppressed as in the small spectral transmission range of the filter component 4 the ambient light S contributes to an overall intensity only to a comparably minor proportion. Thus, by means of the adjustable spectral filter component 4 the sensitivity of the sensor device 1 can be increased and/or the required intensity of the emitted radiation R can be decreased.

The semiconductor chip 2, the sensor chip 3, the filter component 4, the wavelength determination unit 5 and the filter driver 6 can be located on a carrier 8. The mentioned components can be realized as separate components that are applied to the carrier. Other than shown in FIG. 1, at least the wavelength determination unit 5 and the filter driver 6 can be integrated in the carrier at least in part. For example, the carrier 8 is made of silicon and can comprise electronics like transistors. That is, the carrier 8 can include integrated circuits or is fashioned as an IC chip.

Figure 2:
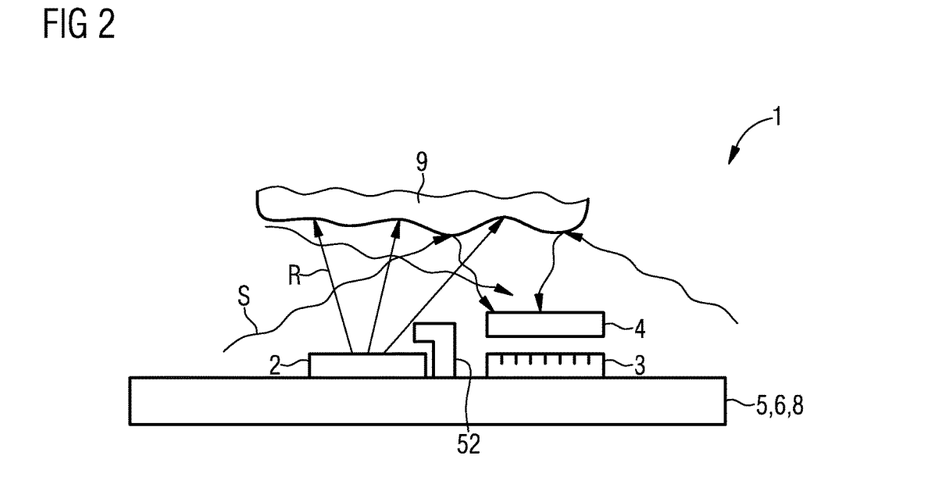

According to FIG. 2, the radiation R is emitted in a larger angular range. For example, the object 9 is completely or nearly completely illuminated by the radiation R on a side facing the sensor device 1. In this case, the sensor device 1 can be an iris recognition sensor, for example. Hence, the sensor chip 3 can comprise a plurality of pixels to image the object 9.

As possible in all the other exemplary embodiments, the spectral filter component 4 does not necessarily need to be in direct contact with the sensor chip 3 as illustrated in connection with FIG. 1, but can be arranged at some distance from the sensor chip 3, compare FIG. 2.

In FIG. 2 it is shown that the wavelength determination unit 5 and the filter driver 6 are at least in part incorporated in the carrier 8. As in all the other exemplary embodiments, it is possible that the wavelength determination unit 5 includes a spectral sensor 52. As an option, the peak wavelength of the radiation R emitted by the semiconductor chip 2 can be directly measured in the spectral sensor 52. The spectral sensor 52 can be present as an alternative or in addition, for example, to the temperature sensor 51 as indicated in FIG. 1.

Figure 3:
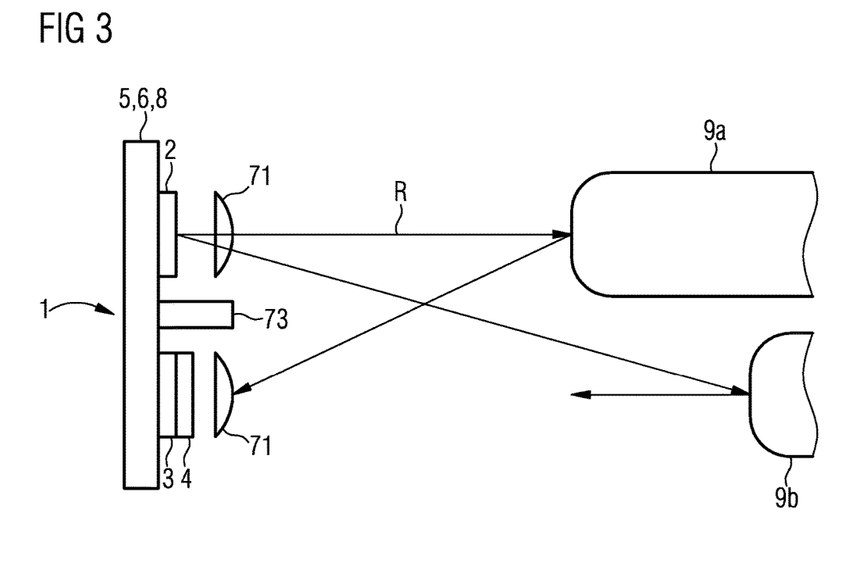

According to FIG. 3, the sensor device 1 can be fashioned as a time-of-flight sensor to accurately measure the distance of objects 9a, 9b. The objects 9a, 9b are arranged at different distances to the sensor device 1. By means of the sensor chip 3 it is measured when portions of reflected radiation R reach the sensor chip 3. A distance of the objects 9a, 9b to the sensor device 1 can be comparatively large, for example, at least 5 m and/or at most 250 m.

As also possible in all other exemplary embodiments, there can be an optical element 71 in front of the sensor chip 3 and/or in front of the semiconductor chip 2. By means of the at least one optical element 71, the radiation R can be shaped and/or an imaging of the reflected radiation onto the sensor chip 3 is enabled.

As an option, there can be an optical barrier 73 between the semiconductor chip 2 and the sensor chip 3. Thus, direct optical crosstalk between the semiconductor chip 2 and the sensor chip 3 can be avoided or reduced.

Figure 4:
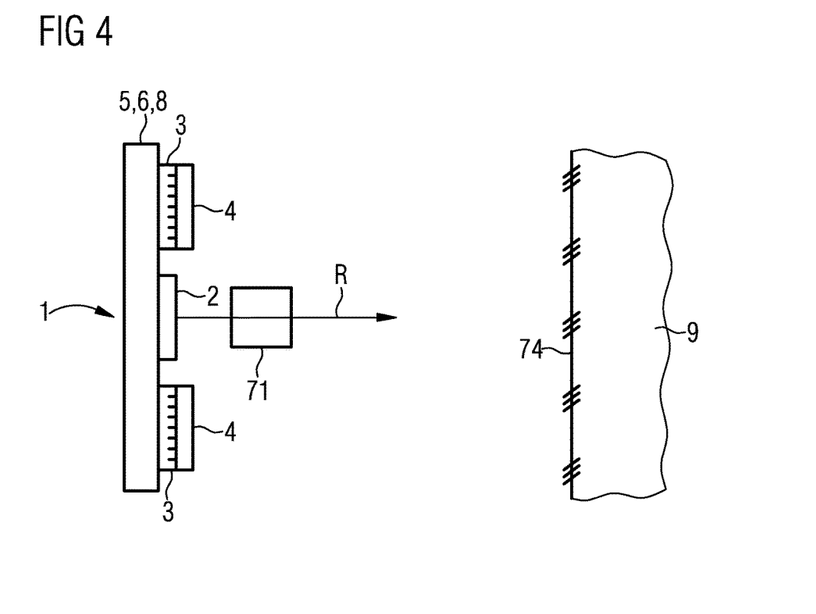

In FIG. 4, the sensor device 1 emits an irradiation pattern 74 onto the object 9. The object 9, for example, is arranged at a comparably small distance to the sensor device 1, for example, just a couple of meters away. A surface of the object 9 facing the sensor device 1 can be comparably flat and can have a low contrast. The irradiation pattern 74 is, for example, a regular pattern of lines and/or dots.

Preferably, the sensor device 1 comprises a plurality of sensor chips 3, each provided with a spectral filter component 4. Thus, stereoscopic viewing is enabled and three-dimensional measurement of the object 9 is also enabled.

To form the irradiation pattern 74, preferably the optical element 71 is provided in front of the semiconductor chip 2. By means of the optical element 71, the radiation R is formed so that the irradiation pattern 72 occurs on the object 9. For example, the optical element 71 is a lens array or a mirror array or can also be a movable mirror like an MEMS component.

Figure 5:
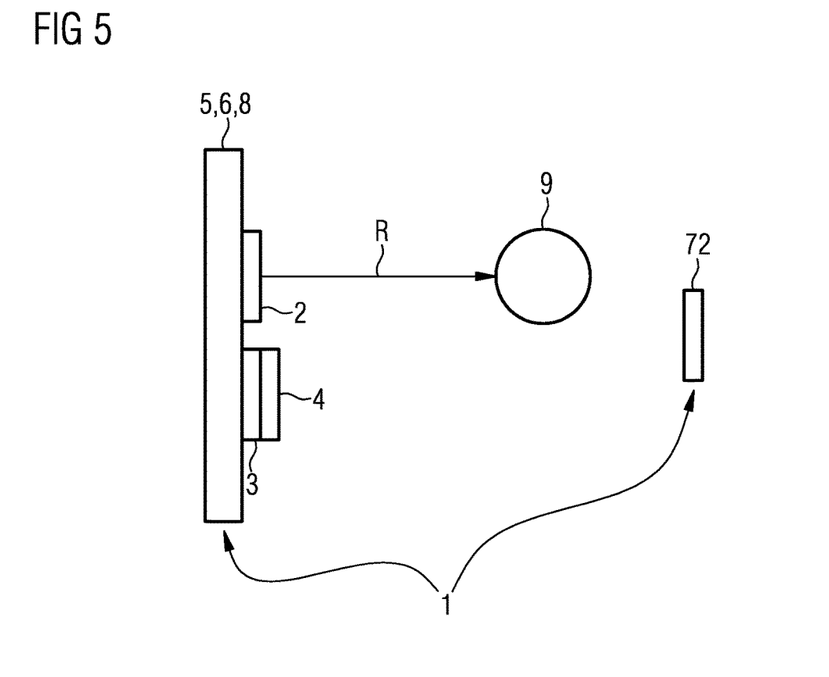
Figure 6:
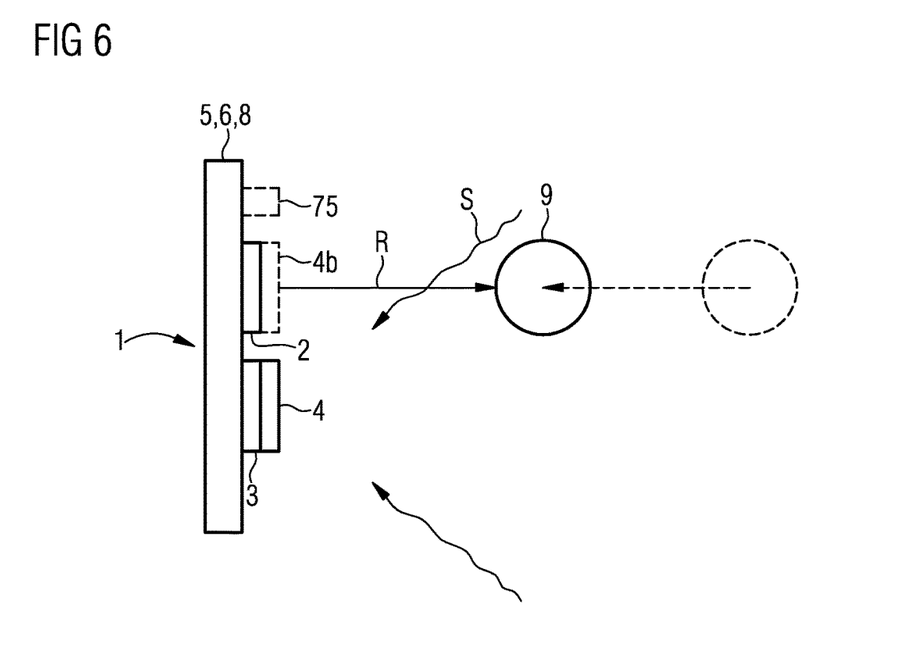

According to FIG. 5, the sensor device 1 is configured as a light barrier. Thus, the sensor device 1 comprises a further mirror 72 which is at a distance to the carrier 8 with the semiconductor chip 2 and the sensor chip 3. The sensor chip 3 detects the radiation R emitted from the semiconductor 2 and reflected back to the carrier 8 at the distant mirror 72. Thus, the sensor device 1 can detect the object 9 that disturbs an optical path between the semiconductor chip 2 and the distant mirror 72. The mirror 72 can be of a specular reflective manner or of diffusive reflective manner.

In the exemplary embodiment of FIG. 4, the sensor device 1 is configured as a proximity sensor. Thus, the sensor device 1 is sensitive to the object 9 just beginning at a distinct distance.

As in all other exemplary embodiments it is possible, as an option, that there is an additional spectral filter component 4b in front of the semiconductor chip 2. Thus, it is possible to match the spectrum of the radiation R emitted by the semiconductor chip 2 to the sensitivity of the sensor chip 3. Other than shown, it is possible that a common filter component spans over the sensor chip 3 as well as over the semiconductor chip 2.

Moreover, as an option, it is possible that there is a radiation sensor 75. The radiation sensor 75 can be optically coupled to the semiconductor chip 2, in particular to a light output after the radiation R passes through the further filter component 4b. Thus, the spectral transmission range of the filter components 4, 4b can simply be adjusted to the wavelength range of the radiation R by maximizing the light intensity at the radiation sensor 75. Such a radiation sensor 75 can be comprised by the wavelength determination unit 5 and can also be present in the other exemplary embodiments.

Figure 7A:
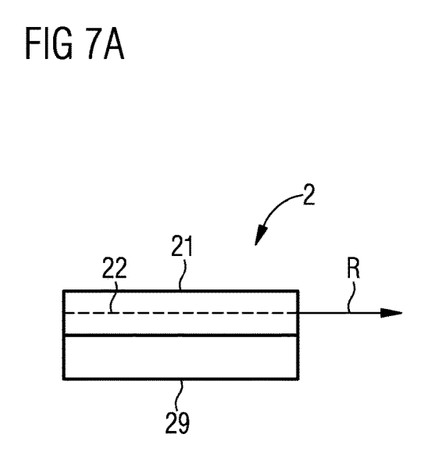
FIGS. 7A-7B show schematic sectional representations of radiation-emitting semiconductor chips for optoelectronic sensor devices.

In FIG. 7A it is shown that the radiation-emitting semiconductor chip 2 is an edge-emitting laser diode. The semiconductor chip 2 comprises a substrate 29 bearing a semiconductor layer sequence 21. The semiconductor layer sequence 21 has at least one active layer 22. The radiation R is emitted in a direction parallel to the active layer 22.

The semiconductor layer sequence is preferably based on a III-V compound semiconductor material. The semiconductor material is, for example, a nitride compound semiconductor material such as $Al_nIn_{1-n-m}Ga_mN$ or a phosphide compound semiconductor material such as $Al_nIn_{1-n-m}Ga_mP$ or also an arsenide compound semiconductor material such as $Al_nIn_{1-n-m}Ga_mAs$, wherein in each case $0 \leq n \leq 1$, $0 \leq m \leq 1$ and $n+m \leq 1$ applies. The semiconductor layer sequence may comprise dopants and additional constituents. For simplicity's sake, however, only the essential constituents of the crystal lattice of the semiconductor layer sequence are indicated, i.e., Al, As, Ga, In, N or P, even if these may in part be replaced and/or supplemented by small quantities of further substances. The semiconductor layer sequence is particularly preferably based on the AlInGaAs material system.

Figure 7B:
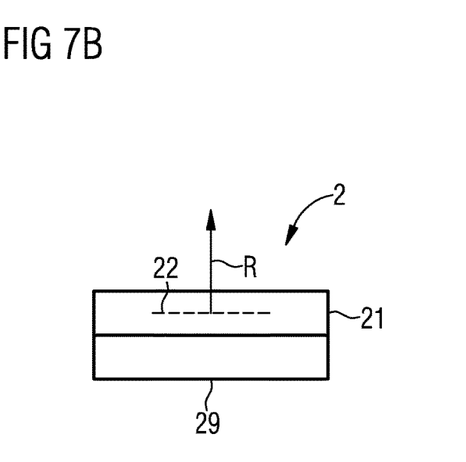

Contrary to FIG. 7A, the semiconductor chip 2 of FIG. 7B is designed as a vertical cavity surface-emitting laser, VCSEL for short. Hence, the radiation R is emitted in a direction perpendicular to the active layer 22.

In FIG. 7A as well as in FIG. 7B it is possible that there is an array of emitting regions on a facet or on a surface of the semiconductor layer sequence 21. Hence, more than one emitting region can be combined to form a greater emitting region, for example, an array of single VCSELs.

Figure 8:
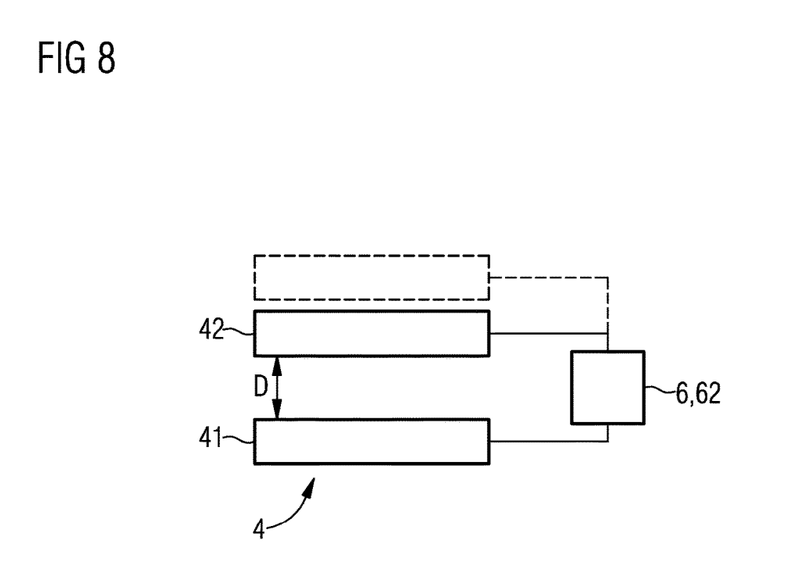
FIGS. 8 to 10 show schematic sectional representations of exemplary embodiments of spectral filter components for optoelectronic sensor devices.

In FIG. 8 it is illustrated that the filter component 4 comprises a first mirror 41 and a second mirror 42. Thus, a Fabry-Perot interferometer is formed. For example, the second mirror 42 is movable so that a distance D can be adjusted by the filter driver 6, for example, by application of a voltage by means of a voltage source 62.

For example, the filter component 4 of FIG. 8 is configured as described in document US 2011/0279824 A1, the disclosure content of which is included by reference.

Figure 9:
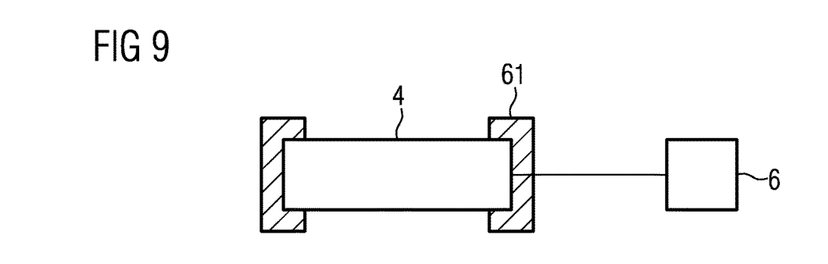

According to FIG. 9, the filter driver 6 comprises a temperature control unit 61, for example, a heating unit. Hence, the temperature of the spectral filter component 4 can be adjusted by the filter driver 6. By means of a defined temperature, the spectral transmission range of the filter component is adjusted.

Figure 10:
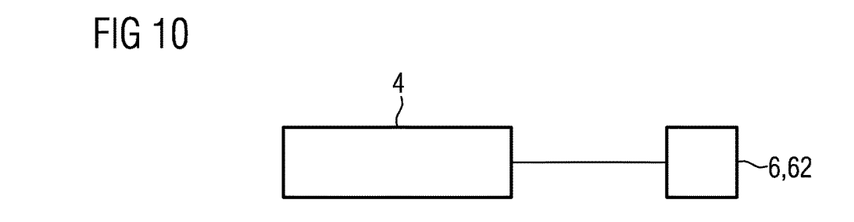

In FIG. 10 it is schematically illustrated that the filter component 4 comprises at least one electrochromic material. By application of a voltage by means of the voltage source 62 in the filter driver 6, the spectral transmission of the filter component 4 can be adjusted.

Figure 11:
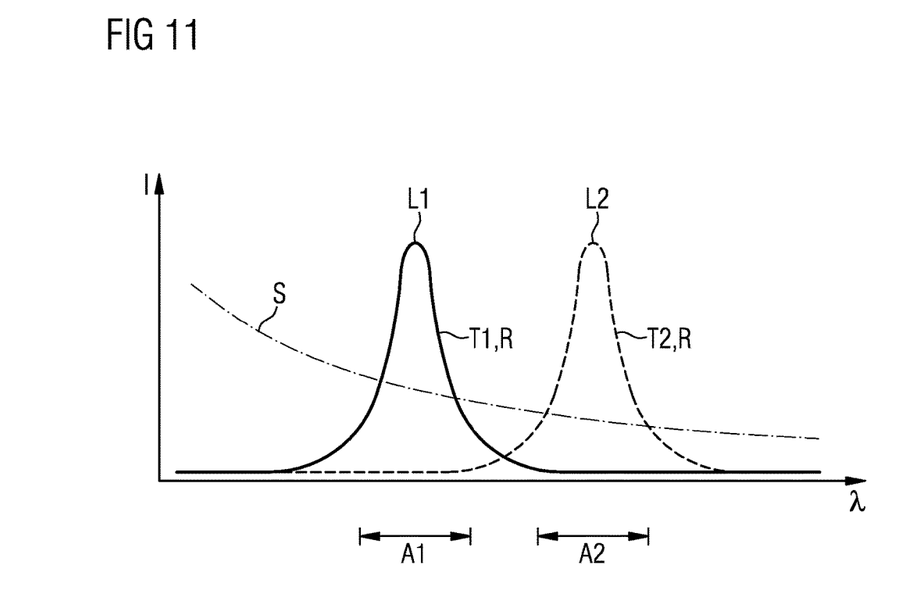
FIG. 11 schematically shows a spectral behavior of an optoelectronic semiconductor device described herein in an exemplary method to operate said sensor device.

In FIG. 11, the spectral properties of an exemplary sensor device 1 are illustrated. Depending on a temperature T1, T2, the radiation R emitted by the semiconductor chip 2 has different peak wavelengths L1, L2. A spectral width of the radiation R is similar to the spectral transmission ranges A1, A2 of the filter component 4. Thus, it is necessary to adjust the spectral transmission ranges A1, A2 to the peak wavelengths L1, L2. Hence, ambient light S is significantly suppressed due to the application of the small spectral transmission ranges A1, A2.

Otherwise, in a common device there is only one large spectral transmission range spanning the complete spectral range in which the radiation R can lie in an intended operational temperature range of a deviation of a sensor device. Thus, a significant amount of ambient light S is then collected in the sensor chip and only a comparably low signal-to-noise ratio can be achieved contrary to what the case is in the optoelectronic semiconductor device 1 described herein.

The invention described here is not restricted by the description given with reference to the exemplary embodiments. Rather, the invention encompasses any novel feature and any combination of features, including in particular any combination of features in the claims, even if this feature or this combination is not itself explicitly indicated in the claims or exemplary embodiments.

What is claimed is:

1. An optoelectronic sensor device comprising:
   a radiation-emitting semiconductor chip configured to emit a radiation with a peak wavelength which depends on a temperature of the radiation-emitting semiconductor chip;
   a sensor chip configured to detect a part of the radiation reflected back to the sensor chip;
   a spectral filter component being an interference filter and having an adjustable spectral transmission range between 2 nm and 15 nm inclusive;
   a wavelength determination unit configured to determine the peak wavelength; and
   a filter driver configured to adjust the spectral transmission range to the determined peak wavelength,
   wherein a change of the peak wavelength, which depends on the temperature of the radiation-emitting semiconductor chip, is between 0.1 nm/° C. and 0.9 nm/° C. inclusive, and wherein a spectral width of the emitted radiation is between 1 nm and 15 nm inclusive.

2. The sensor device of claim 1, wherein the filter component is a Fabry-Perot device, wherein the spectral transmission range is adjusted by a distance between two mirrors of the Fabry-Perot device, and wherein a size of the filter component in top view amounts to at most 5 mm×5 mm.

3. The sensor device of claim 1, wherein the radiation-emitting semiconductor chip is a pulsed semiconductor laser, and wherein the peak wavelength of which is between 780 nm and 980 nm inclusive.

4. The sensor device of claim 1, wherein the filter driver comprises a voltage source configured to control a voltage to the filter component so that the spectral transmission range is controllable by adjusting the voltage at the filter component.

5. The sensor device of claim 1, wherein the filter driver comprises a temperature control unit configured to control a temperature of the filter component so that the spectral transmission range is controllable by adjusting the temperature of the filter component.

6. The sensor device of claim 1, wherein the filter driver comprises a temperature sensor configured to measure the temperature of the radiation-emitting semiconductor chip, and wherein the peak wavelength is calculated in the filter driver from the measured temperature of the radiation-emitting semiconductor chip.

7. The sensor device of claim 1, wherein the sensor device comprises at least two sensor chips and an optical element, wherein the optical element is configured to form a two-dimensional irradiation pattern of the radiation, and wherein a reflected irradiation pattern detected by the sensor chips allows for a three-dimensional measuring of an object illuminated with the irradiation pattern.

8. The sensor device of claim 1, wherein the sensor chip allows a time-of-flight measurement of the radiation from the radiation-emitting semiconductor chip.

9. The sensor device of claim 1, further comprising a distant mirror configured to reflect the radiation from the radiation-emitting semiconductor chip to the sensor chip, and wherein the sensor device is a light barrier.

10. The sensor device of claim 1, wherein the sensor chip comprises a plurality of pixels and an optical element so that the radiation reflected back to the sensor chip is imaged onto the pixels, and wherein the sensor device is a biometric recognition system.

11. The sensor device of claim 1, wherein the sensor device is a proximity sensor.

12. A method for operating an optoelectronic sensor device, wherein the optoelectronic sensor device comprises a radiation-emitting semiconductor chip, a sensor chip, a spectral filter component being an interference filter and having an adjustable spectral transmission range between 2 nm and 15 nm inclusive, a wavelength determination unit and a filter driver, the method comprising:
   emitting, by the radiation-emitting semiconductor chip, a radiation with a peak wavelength which depends on a temperature of the radiation-emitting semiconductor chip, wherein a change of the peak wavelength, which depends on the temperature of the radiation-emitting semiconductor chip, is between 0.1 nm/° C. and 0.9 nm/° C. inclusive, and wherein a spectral width of the emitted radiation is between 1 nm and 15 nm inclusive;
   detecting, by the sensor chip, a part of the radiation which is reflected back to the sensor chip by an object located in an exterior of the sensor device;
   determining, by the wavelength determination unit, the peak wavelength at least temporarily; and
   adjusting, by the filter driver, the spectral transmission range to the determined peak wavelength.

13. The method of claim 12, wherein the filter driver varies the spectral transmission range.

14. The method of claim 12, further comprising:
   emitting test pulses;
   measuring, by the sensor chip, intensities of reflections of the test pulses;
   determining, by the wavelength determination unit, the peak wavelength based on the measured intensities; and
   tuning, by the filter driver, the spectral transmission range to maximize a measured intensity.

\* \* \* \* \*